United States Patent [19]

Asakura et al.

[11] 4,218,825
[45] Aug. 26, 1980

[54] METHOD AND APPARATUS FOR DETERMINING AXES OF CYLINDRICAL BLANKS

[75] Inventors: Kouichi Asakura, Tokyo; Makoto Sagara, Shizuoka, both of Japan

[73] Assignee: Toshiba Kikai Kabushiki Kaisha, Tokyo, Japan

[21] Appl. No.: 965,780

[22] Filed: Dec. 4, 1978

[30] Foreign Application Priority Data

Dec. 5, 1977 [JP] Japan .............................. 52-145827

[51] Int. Cl.³ .............................................. G01B 7/31
[52] U.S. Cl. .................................. 33/174 Q; 33/178 E; 33/180 R; 33/DIG. 2; 82/DIG. 8; 318/652
[58] Field of Search ............ 33/174 Q, 174 M, 174 L, 33/174 TA, 174 TD, 178 E, 180 R, 181 R, 185 R, DIG. 2; 82/2 D, DIG. 8; 269/58, 59, 60, 71, 119; 318/625, 652, 656, 657

[56] References Cited

U.S. PATENT DOCUMENTS

| | | | |
|---|---|---|---|
| 3,259,989 | 7/1966 | Wilson | 33/174 L |
| 3,270,423 | 9/1966 | Birrell et al. | 33/174 L |
| 3,831,283 | 8/1974 | Pagella et al. | 33/DIG. 2 |
| 3,911,257 | 10/1975 | Whitehouse et al. | 33/174 Q |
| 4,016,470 | 4/1977 | Gabor et al. | 33/181 R |
| 4,026,031 | 5/1977 | Siddall et al. | 33/174 L |
| 4,080,741 | 3/1978 | Siddall et al. | 33/178 E |

Primary Examiner—Richard R. Stearns
Attorney, Agent, or Firm—Koda and Androlia

[57] ABSTRACT

A cylindrical blank is mounted on the turn table of a vertical lathe with the axis of the former as close as possible to the axis of the latter. The angle between a reference point on the periphery of the blank and a measuring point circumferentially displaced from the reference point and the deviation of the periphery at the measuring point from a circle about the axis of the turn table are measured. Then an axis at which the dispersion of the deviation at the measuring point is a minimum is calculated by using the measured angles and the deviations to determine the distance between the axis of the blank and the axis of the turn table, and press members mounted on the turn table are actuated to move the blank by the distance thus determined to coincide the axis of the blank with the axis of the turn table.

8 Claims, 4 Drawing Figures

METHOD AND APPARATUS FOR DETERMINING AXES OF CYLINDRICAL BLANKS

BACKGROUND OF THE INVENTION

This invention relates to a method and apparatus for determining the axis of a cylindrical blank so as to align its axis with the axis of rotation of the turn table, for example, of a vertical lathe.

Determination of the axis of a cylindrical blank or workpiece mounted on the turn table of such machine tool as a vertical lathe generally relies upon the skill and experience of a workman so that the time and work required by such centering operation are considerably large.

SUMMARY OF THE INVENTION

It is an object of this invention to provide an improved method and apparatus capable of accurately and quickly determining the axis of a cylindrical body or a workpiece to be machined with a lathe, for example.

According to one aspect of this invention there is provided an apparatus for determining an axis of a cylindrical blank mounted on a turn table, comprising means for mounting the cylindrical blank on the turn table with an axis of the former positioned near that of the latter, means for measuring angles between a reference point on the periphery of the cylindrical blank and at least three measuring points on the periphery which are circumferentially spaced from the reference point, means for measuring deviations of the periphery of the blank from a circle about the axis of the turn table at the measuring points, means for calculating an axis at which dispersion of the deviations at the measuring points is a minimum thereby determining the distance between the axis of the cylindrical blank and the axis of the turn table, press members mounted on the turn table to be movable toward and away from the axis of the turn table, and control means responsive to said distance for actuating the press members for moving the blank on the turn table by said distance so as to coincide the axis of the cylindrical blank with the axis of the turn table.

DESCRIPTION OF THE PREFERRED EMBODIMENT

One method of calculating the axis of a circular body according to this invention will be firstly described with reference to FIGS. 3 and 4. As above described, the deviation of the inner or outer periphery of a cylindrical or annular blank or workpiece from a circle about the axis of the turn table is measured at more than three points.

Assume now that N measuring points are selected on the outer periphery of a circular blank 9 (the number of N is at least 3), that the points are numbered in the counter clockwise direction starting from a press member 8A which is taken as a reference, that the angle subtended by the reference press member 8A and the ith measuring point is denoted by $\theta_i$ and that the deviation at this measuring point from a circle about the axis of the turn table is denoted by $X_i$. After moving the reference press member 8A by $a_1$ toward the center of rotation of the blank 9 (at this time, the opposite press member 8C is moved by $-a_1$), when a press member 9B at a position 90° from the reference press member 8A in the counter clockwise direction is moved by $a_2$ toward the axis of the blank 9 (at this time the opposite press member 8D is moved by $-a_2$), the amount of movement $\delta_i$ (the increment of the measured data) can be analyzed as a trigonometric function as shown by FIG. 4 so that $\delta_i$ is expressed as follows:

$$\delta_i = a_1 \cos \theta_i + a_2 \sin \theta_i$$

Consequently, the distance $X_i'$ after the movement can be expressed by the following equation:

$$X_i' = X_i + \delta_i$$

where $\delta_i$ represents the varied distance.

Strictly speaking, the configuration of the blank 9 after cutting is not a true circle, so that it is necessary to rely upon some sort of method of evaluation. According to one method, a position at which the dispersion of the value of $X_i$ which is calculated statistically is a minimum is taken as the optimum centering position. Thus, expressing this in terms of the method of least minimum, $$\sum_{i=0}^{n} \{X_i' - \bar{x}_i'\} \longrightarrow \min.$$

The optimum amounts of movements $a_1$ and $a_2$ can be determined by substituting $$X_i' = X_i + a_1 \cos \theta_i + a_2 \sin \theta_i$$

in the equation just described.

The method and apparatus for centering according to this invention will now be described with reference to FIGS. 1 and 2.

Figure 1:
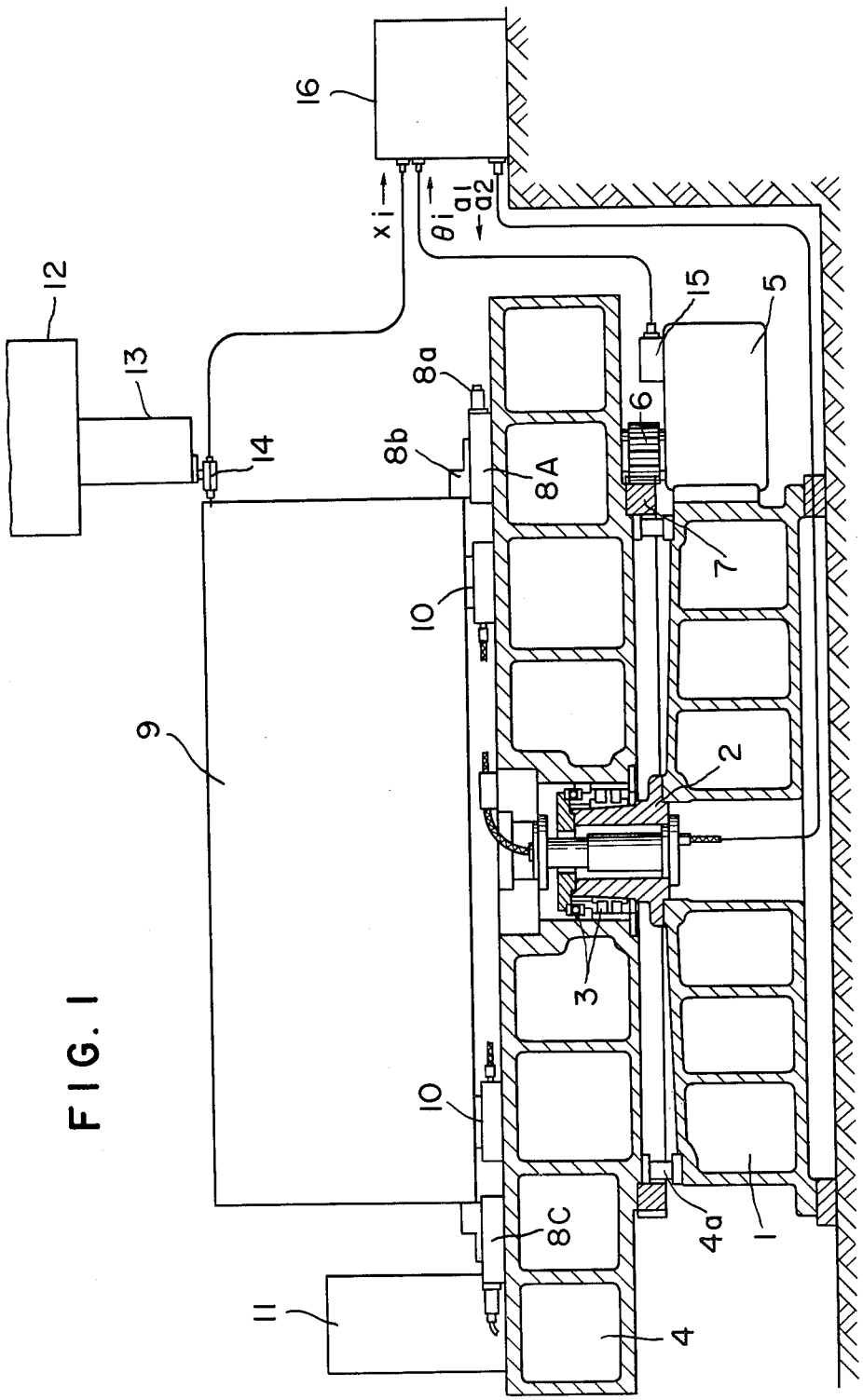
FIG. 1 is a side view, partly in section, showing the centering apparatus embodying the invention which determines the axis of a cylindrical blank mounted on the rotary disc or turn table of a vertical lathe.
Figure 2:
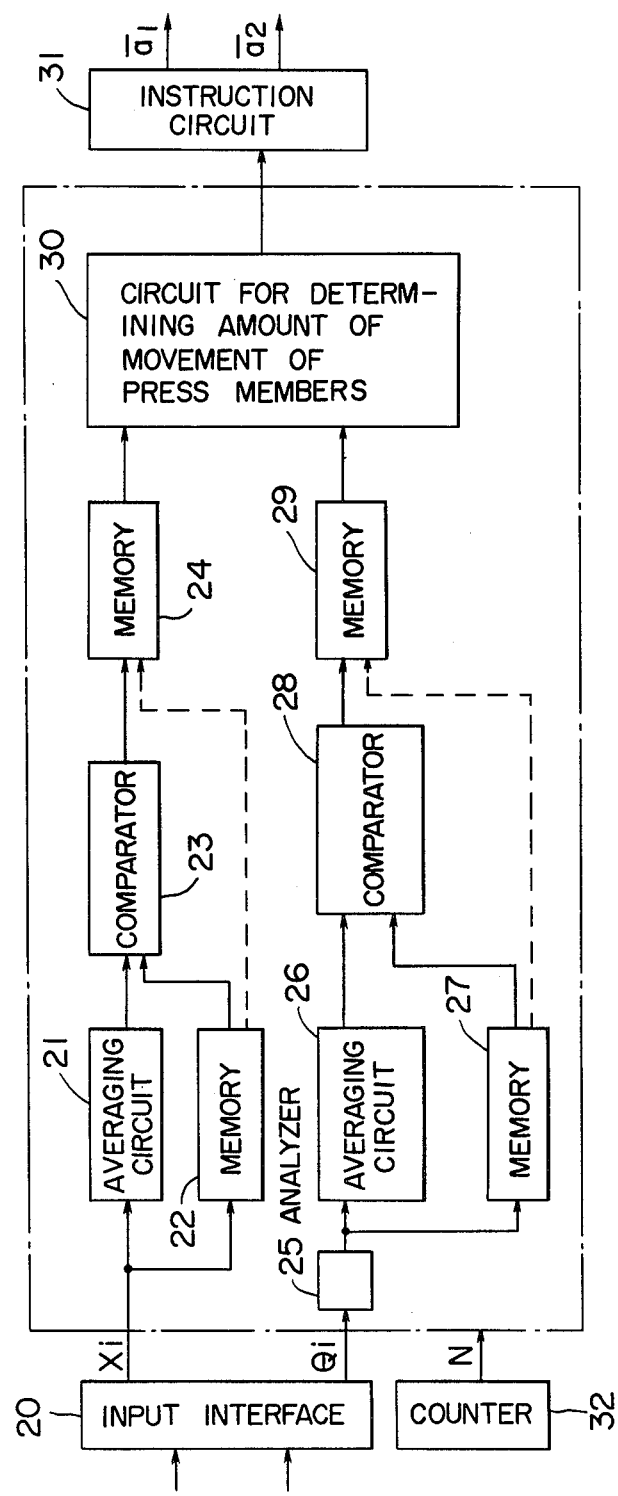
FIG. 2 is a block diagram showing the procedure of data processing in an analytical control device.

In the embodiment shown in FIGS. 1 and 2, as the means for rotating the turn table and the blank mounted thereon by any desired angle and then stopping the turn table and the blank at any desired angular position, an ON, OFF controlled electric source for the turn table of a conventional vertical lathe not provided with an indexing mechanism is used, and as the means for detecting the angular position of the turn table, a detecting device for detecting the indexing angle of a gear meshing with the turn table is used. Stepping motors and movable pawls driven thereby are used as pairs of opposing press members which are secured on the turn table along straight lines passing through the axis of the turn table. The distance between a fixed point and any or predetermined measuring point on the blank, that is the deviation, is measured with, for example, an electric micrometer.

An analytical control device including a microcomputer is used as the control device that applies instructions to the press members in accordance with the amount of movement determined by computing means that determines the amount of movement of the axis of the blank with respect to the axis of the turn table which makes minimum the dispersion of the distance described above.

The centering apparatus of this invention shown in FIG. 1 comprises a horizontal bed 1 mounted on a floor, a hollow shaft 2 provided at the central portion of the bed, a bearing 3 fitted about the shaft 2, a turn table 4 rotatably supported by the bearing 3 and bearings 4a provided beneath the outer periphery of the turn table 4 for rotatably supporting the same on the bed 1, a casing 15 secured to one side of the bed 1 and containing a variable speed gear train and a driving motor, not shown, a pinion 6 secured to the output shaft of the gear train, a ring gear 7 secured to the lower side of the turn table 4 to mesh the pinion 6. Consequently, it is possible to rotate the turn table 4 by the motor contained in the casing 5 through the variable speed gear train, pinion 6 and ring gear 7. Furthermore, there are provided two pairs of opposing press members 8A, 8B, 8C and 8D disposed along two straight lines intersecting at right angles at the center of the turn table 4, a cylindrical blank 9 to be centered, static pressure pads 10 secured on the surface of the turn table 4 for facilitating the movement of the blank 9, static pressure unit 11 mounted on the turn table 4 for supplying compressed air or pressurized oil to the static pressure pads 10 and the static pressure bearings 4a. The press members 8A-8D are secured on the turn table 4 at positions correspoing to the diameter of the blank 9. In the illustrated example, each press member is constructed to be reciprocated by a pawl 8b actuated by a stepping motor 8a. A tool post 12 is supported by a beam, not shown, of a vertical lathe for guiding the vertical motion of a tool supporting rod 13. An electric micrometer 14 is mounted on one side of the tool supporting rod 13 such that it is normally spaced from the blank so as to prevent interference which occurs when the blank 9 is rotated.

A detector 15 is provided which is interlocked with the electric motor in the casing 5 so as to detect the index angle after the turn table has rotated a predetermined angle and an analytical control device 16 is mounted on the floor and contains a micro-computer to analyze the data supplied from the electric micrometer 14 and the detector 15 for applying a movement instruction to the press members 8A-8D to align the axis of the blank 9 with that of the turn table 4.

To effect measurement, the blank 9 is mounted on the turn table 4 through the static pressure pads 10 (where the blank is small, the pads 10 are not necessary). Then press members 8A-8D are urged against the periphery of the blank 9 in four directions to fix the blank 9 at a desired position. Under these conditions, the blank is mounted on and secured to the upper surface of the turn table with its axis positioned as close as possible to the axis of the turn table based on the feeling and experience of the operator. Where the blank is hollow or annular, the press members may be urged against the inner periphery of the blank. Then the turn table 4 and the blank 9 are indexed to any desired angles and the deviation of the periphery of the blank 9 from a circle about the axis of the turn table at the measuring point and the angle between the measuring point and a reference point on the periphery of the blank 9 are measured by such measuring instrument as the electric micrometer 14 installed at a fixed position, for example on the tool rod 13, for applying the measured data to the analytic control device 16. These data are calculated according to the procedure shown in the block diagram of FIG. 2 to determine the amount of movement of the movable pawls of the press members 8. Thus, a movement instruction is applied to the press members 8A-8D to effect centering of the blank.

Figure 3:
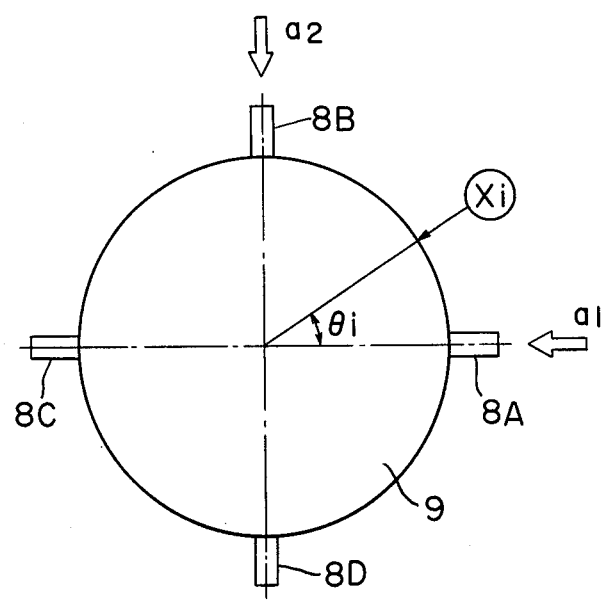
FIGS. 3 and 4 are diagrams used to explain the amount of movement caused by press members.
Figure 4:
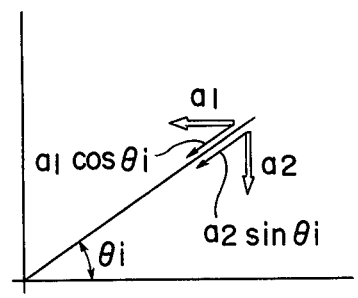

Turning now to the block diagram shown in FIG. 2 there are provided an input interface 20 which is connected to receive the distance or deviation $X_i$ and the angle $\theta_i$ at the reference point and includes a filter circuit for eliminating abnormal data from the inputs, a counter 32 for counting the number of the measuring points, an averaging circuit 21 for determining the mean value of N (an integer) distance data produced by the input interface 20, a memory device 22 which stores N distance data, a comparator 23 for determining the differences or deviations between the mean value of the distance data and N distance data, a memory device 24 that stores N deviations obtained by the comparator 23, an analyzer 25 which decomposes angle $\theta_i$ measured at the measuring point and produced by the interface 20 into $\cos \theta_i$ and $\sin \theta_i$, an averaging circuit 26 which determines the mean values of $N \cos \theta_i$ and $N \sin \theta_i$ produced by the analyzer 25, a memory device 27 which stores N data of $\sin \theta_i$ and $\cos \theta_i$ produced by the analyzer 25, a comparator 28 which determines the deviations between the mean value of $\cos \theta_i$ and the data of $N \cos \theta_i$ and between the mean value of $\sin \theta_i$ and the data of $N \sin \theta_i$, a memory device 29 for storing the deviation data obtained by the comparator 28, a circuit 30 for determining the amounts of movements $a_1$ and $a_2$ of the press members 8 shown in FIG. 3, based on the data read out from the memory devices 24 and 29, and an instruction circuit 31 which contains a filter for eliminating abnormal data from the output produced by the circuit 30 and which forms an instruction corresponding to the mode of movement. Accordingly, when the blank 9 is to be moved in the direction toward its axis, the press members 8C and 8D (see FIG. 3) are moved away from the blank whereas press members 8A and 8B are moved toward the blank by the amounts of movement determined by the circuit 30. After the blank 9 has been moved in this manner, the press members 8C and 8D are urged against the blank 9 to fix the same. It is also possible to move the press members 8C and 8D toward the blank and move the press members 8A and 8B away from the blank. Although in this embodiment, the press members are disposed in pairs along two straight lines which cross each other at right angles at the center of rotation of the turn table, it is possible to arrange the press members at any angular positions on the turn table, in which case their positions are stored in the memory device for accomplishing the same result. By selecting the measuring points of the blank 9 to be the points equally spaced about the periphery of the blank, detector 15 for detecting the indexed angular position may be omitted.

For this reason, the turn table may be an ordinary turn table or a turn table provided with electrical or mechanical indexing means that can index equally.

Although in this embodiment, an electric micrometer engaging a blank to be measured was used as the measuring means any other measuring means such as a dial gauge or a non-contact type laser beam measuring device can also be used. Furthermore, although an analytical control device including a micro-computer was used as the computing and control means, it will be clear that a modified table type computer or a control device designed for numerically controlling a machine tool and incorporated with a computation circuit can also be used.

As above described according to this invention, it is possible to determine the center of a cylindrical body adapted to be machined with a lathe, for example, in a short time and at high accuracies, thus improving the working efficiency. Even when the shape of the workpiece departs a true circle so that the distance between a fixed point and measuring point varies it is possible to determine the center at high accuracies.

What is claimed is:

1. Apparatus for determining an axis of a cylindrical blank mounted on a turntable comprising:

means for mounting said cylindrical blank on said turntable with the axis of the former positioned near that of the latter;

means for measuring angles between a reference point on the periphery of said cylindrical blank and at least three measuring points on said periphery which are circumferentially spaced from said reference point;

means for measuring deviations of the periphery of said blank from a circle about the axis of said turntable at said measuring points;

means for calculating an axis at which dispersion of said deviations at said measuring points is a minimum thereby determining the distance between the axis of said cylindrical blank and the axis of said turntable;

press members mounted on said turntable to be movable toward and away from the axis of said turntable; and control means responsive to said calculated axis for actuating said press members for moving said blank on said turntable by said distance so as to coincide the axis of said cylindrical blank with the axis of said turntable;

said calculating means comprising:

a counter for counting the number of said measuring points;

means for determining a mean value of said deviations measured at a plurality of measuring points;

an analyzer for analyzing $\theta$ (where $\theta$ represents the angle between said reference point and any one of said measuring points) into $\cos \theta$ and $\sin \theta$;

means for determining a mean value of a plurality of $\cos \theta$'s and a plurality of $\sin \theta$'s;

first memory means for storing said deviations;

second memory means for storing said $\cos \theta$'s and said $\sin \theta$'s produced by said analyzer;

a first comparator for determining the difference between said mean value of the deviations and respective deviations stored in said first memory means;

a second comparator for determining the difference between said mean values of a plurality of $\cos \theta$'s and of a plurality of $\sin \theta$'s and of a plurality of $\sin \theta$'s and said $\cos \theta$'s and $\sin \theta$'s stored in said second memory means;

means responsive to the outputs of said first and second comparators for determining the amount of movement of said press members necessary to coincide the axis of said blank with the axis of said turntable; and means responsive to said amount of movement for applying an instruction to said press members so as to move them by said amount of movement.

2. The apparatus according to claim 1 wherein said press members are arranged on a plurality of straight lines intersecting with each other at the axis of said turn table to engage the outer periphery of said blank.

3. The apparatus according to claim 1 wherein said blank is a hollow cylindrical body and said press members are arranged on a plurality of straight lines intersecting with each other at the axis of said turn table to engage the inner periphery of said blank.

4. The apparatus according to claims 2 or 3 wherein said straight lines intersect with each other at right angles.

5. The apparatus according to claim 4 wherein each press member is moved toward and away from the inner or outer periphery of said cylindrical blank by a pulse motor.

6. The apparatus according to claim 1 wherein said cylindrical blank is supported by said turn table through static pressure pads disposed near the periphery of said blank.

7. The apparatus according to claim 1 which further includes means for indexing said turn table to said measuring points.

8. The apparatus according to claim 1 wherein said turn table comprises a turn table of a vertical lathe having vertical tool supporting means and wherein said deviation measuring means comprises an electric micrometer mounted on said tool supporting means.

* * * * *